United States Patent
Castner

(10) Patent No.: US 12,462,926 B2
(45) Date of Patent: Nov. 4, 2025

(54) SYSTEMS AND METHODS FOR MOBILE DENTAL CARE

(71) Applicant: Dan Castner, Carlsbad, CA (US)

(72) Inventor: Dan Castner, Carlsbad, CA (US)

(*) Notice: Subject to any disclaimer, the term of this patent is extended or adjusted under 35 U.S.C. 154(b) by 564 days.

(21) Appl. No.: 17/513,864

(22) Filed: Oct. 28, 2021

(65) Prior Publication Data
US 2022/0130530 A1 Apr. 28, 2022

Related U.S. Application Data

(60) Provisional application No. 63/106,625, filed on Oct. 28, 2020.

(51) Int. Cl.
| | |
|---|---|
| *G16H 40/20* | (2018.01) |
| *A61G 3/00* | (2006.01) |
| *A61G 15/14* | (2006.01) |
| *B60P 3/00* | (2006.01) |
| *G06F 16/9537* | (2019.01) |
| *G06Q 50/20* | (2012.01) |
| *G08B 5/22* | (2006.01) |
| *G16H 10/60* | (2018.01) |
| *G16H 40/67* | (2018.01) |
| *H04L 67/52* | (2022.01) |

(52) U.S. Cl.
CPC .......... *G16H 40/20* (2018.01); *A61G 3/001* (2013.01); *A61G 15/14* (2013.01); *B60P 3/00* (2013.01); *G06F 16/9537* (2019.01); *G06Q 50/205* (2013.01); *G08B 5/22* (2013.01); *G16H 10/60* (2018.01); *G16H 40/67* (2018.01); *H04L 67/52* (2022.05)

(58) Field of Classification Search
CPC ........ G16H 40/20; G16H 40/67; G16H 10/60; G06F 16/9537; H04L 67/52; A61G 3/001; A61G 15/14; B60P 3/00; G06Q 50/205; G08B 5/22
See application file for complete search history.

(56) References Cited

U.S. PATENT DOCUMENTS

| | | | | | |
|---|---|---|---|---|---|
| 6,082,799 | A | * | 7/2000 | Marek | B60P 3/14 |
| | | | | | 296/19 |
| 8,733,813 | B2 | * | 5/2014 | Blackwell | A61G 10/00 |
| | | | | | 296/24.38 |
| 10,307,313 | B2 | * | 6/2019 | Schroeder | F16M 11/2078 |
| 10,945,810 | B2 | * | 3/2021 | Levine | A61C 7/00 |
| 11,253,409 | B2 | * | 2/2022 | Katzman | G16H 40/20 |
| 2011/0124974 | A1 | * | 5/2011 | Martin | G16H 40/67 |
| | | | | | 600/300 |

FOREIGN PATENT DOCUMENTS

| | | | | |
|---|---|---|---|---|
| EP | 0278626 A1 | * | 7/1988 | |
| GB | 338822 A | * | 11/1930 | |
| WO | WO-2021054987 A1 | * | 3/2021 | ............. A61B 6/145 |

* cited by examiner

*Primary Examiner* — Joseph D. Pape

(57) ABSTRACT

Apparatuses, components, methods, and techniques for providing mobile dental care are provided. An example system for providing mobile dental care includes a mobile dental office having a dental office computing device that is configured to communicate with one or more of a patient/guardian computing device, an institution/venue computing device, and a patient computing device to plan routes for the mobile dental office, to schedule appointments, and to transmit notifications regarding appointments.

18 Claims, 15 Drawing Sheets

← 500

| TIME | CHAIR | School A | TIME | CHAIR | School B | TIME | CHAIR | School C | TIME | CHAIR | School D |
|---|---|---|---|---|---|---|---|---|---|---|---|
| 7:30 AM | Chair 1 | J. Hansen | 9:15 AM | Chair 1 | T. Gordon | 11:00 AM | Chair 1 | F. Lickty | 1:30 PM | Chair 1 | D. Knight |
| 7:30 AM | Chair 2 | G. Smith | 9:15 AM | Chair 2 | B. Jackson | 11:00 AM | Chair 2 | A. Dellinger | 1:30 PM | Chair 2 | K. Kardasian |
| 8:00 AM | Chair 1 | F. Justice | 9:45 AM | Chair 1 | T. Utty | 11:30 AM | Chair 1 | D. Dellinger | 2:00 PM | Chair 1 | G. Molen |
| 8:00 AM | Chair 2 | D. Kramer | 9:45 AM | Chair 2 | C. Sumtion | 11:30 AM | Chair 2 | A. Ratcliff | 2:00 PM | Chair 2 | C. Bauer |
| 8:30 AM | Chair 1 | S. Johnson | 10:15 AM | Chair 1 | F. Diddling | 12:00 Noon | Chair 1 | B. Castner | 2:30 PM | Chair 1 | M. Masters |
| 8:30 AM | Chair 2 | K. Littlefield | 10:15 AM | Chair 2 | S. Smith | 12:00 Noon | Chair 2 | S. Lang | 2:30 PM | Chair 2 | C. Batterman |

| TIME | CHAIR | Bank 1 | TIME | CHAIR | Home 1 |
|---|---|---|---|---|---|
| 3:30 PM | Chair 1 | F. Smith | 5:30 | Chair 1 | G. Davy |
| 3:30 PM | Chair 2 | G. Dave | 5:30 | Chair 2 | C. Davy |
| 4:00 PM | Chair 1 | D. Hurford | FINISH | | |
| 4:00 PM | Chair 2 | S. Larson | | | |
| 4:30 PM | Chair 1 | C. Kettelman | | | |
| 4:30 PM | Chair 2 | D. Costner | | | |

*FIG. 10*

SYSTEMS AND METHODS FOR MOBILE DENTAL CARE

CROSS REFERENCE TO RELATED APPLICATIONS

This application claims priority, as appropriate, to U.S. Ser. No. 63/106,625, titled "SYSTEMS AND METHODS FOR MOBILE DENTAL CARE" and filed Oct. 28, 2020, the disclosure of which is hereby incorporated by reference in its entirety.

BACKGROUND

Dentistry (or dental medicine) is a field of medicine related to care of the dentition and oral cavity. Dentistry may also include care for at least some other elements of craniofacial anatomy. such as a patient's dentition, gum tissue, mandible, maxilla, throat/airway, and temporomandibular joint.

A dental care provider may provide dental care to a patient. Examples of dental care providers include dentists, dental assistants, dental technicians, and dental therapists. Dental care providers may have various specializations, such as endodontics, orthodontics, pediatric dentistry, cosmetic dentistry, periodontics, or prosthodontics.

Often dental care requires multiple visits between a patient and a dental care provider. Patients may, for example, visit a general dentist twice a year for cleaning and check-ups. Depending on the dentist care provider's findings during a check-up, a patient may need additional visits for follow-up care such as to have a cavity filled or to have one or more teeth replaced with a dental restoration (e.g., a crown or bridge).

Orthodontics is a dental specialization that relates to the alignment of teeth and jaws. Orthodontic care may include providing one or more appliances that apply forces to a patient's teeth to reposition the teeth. Providing and managing these appliances may require several appointments. The American Journal of Orthodontics Surveys estimates that the average number of appointments to start and finish an orthodontic treatment is 24. For example, a patient may initially visit an orthodontic office for an initial consultation to determine a treatment plan. This visit may be followed by additional appointments for imaging, placement of an appliance, evaluation of treatment progress, and modification of the appliance or treatment plan as necessary.

Orthodontic braces (also called dental braces) are an example of a dental appliance. Orthodontic braces may include multiple brackets that are bonded to a patient's teeth and one or more arch wires that are disposed within a channel in the brackets. The arch wire will typically flex or curve to fit through the brackets. As the arch wire attempts to return to its original shape (typically an arch), the wire applies a force to the patient's teeth that causes the teeth to move toward a planned alignment. Over time, different wires are used that provide different magnitudes of force or that have different initial shapes. This series of wires will over time move the patient's teeth to a planned alignment in accord with a treatment plan developed by an orthodontist. The adjustment and replacement of wires and brackets requires many appointments with the orthodontist or another dental care provider.

Attending dental appointments may be disruptive and time consuming for the patient and others associated with the patient such as the patient's parents or guardians, teachers, and educational administrators that are required to limit student excused and unexcused absences from school.

SUMMARY

In general terms, this disclosure is directed to systems and methods for providing mobile dental care. In one possible configuration and by non-limiting example, a mobile dental office includes a van having multiple treatment stations. Another example is computing systems for scheduling and notifying patients, parents, and educational administrators about treatments and appointments. Various aspects are described in this disclosure, which include, but are not limited to, the following aspects.

One aspect is a mobile dental office for providing mobile dental care, the mobile dental office comprising: a vehicle assembly having a physically connected storage space, the vehicle assembly being configured to provide a motive force to move the mobile dental office; and a first treatment station disposed in the storage space, the first treatment station configured to be usable to provide dental care to a first patient within the storage space.

Another aspect is a computer-implemented method comprising: transmitting a permission request to a dental care decision maker for the patient, the permission request including a request for permission to excuse the patient from an institution associated with a care location for a dental appointment; receiving from the dental care decision maker approval of the permission request; and responsive to the receiving the permission approval, transmitting the approval of permission request to the institution.

Yet another aspect is a computer system comprising: at least one memory including instructions; and at least one processor that is operably coupled to the at least one memory and that is arranged and configured to execute instructions that, when executed, cause the computer system to: query a datastore for care locations associated with patient having unscheduled appointments; select a care location based on the unscheduled appointments; determine an appointment time block based availability of the selected care location and the unscheduled appointments; and transmit notifications of the determined appointment time block to the determined care location and to patients associated with unscheduled appointments.

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

FIG. 10 is an example schedule that may be generated and followed by a mobile dental office according to some embodiments of the system of FIG. 1.

DETAILED DESCRIPTION

Figure 1:
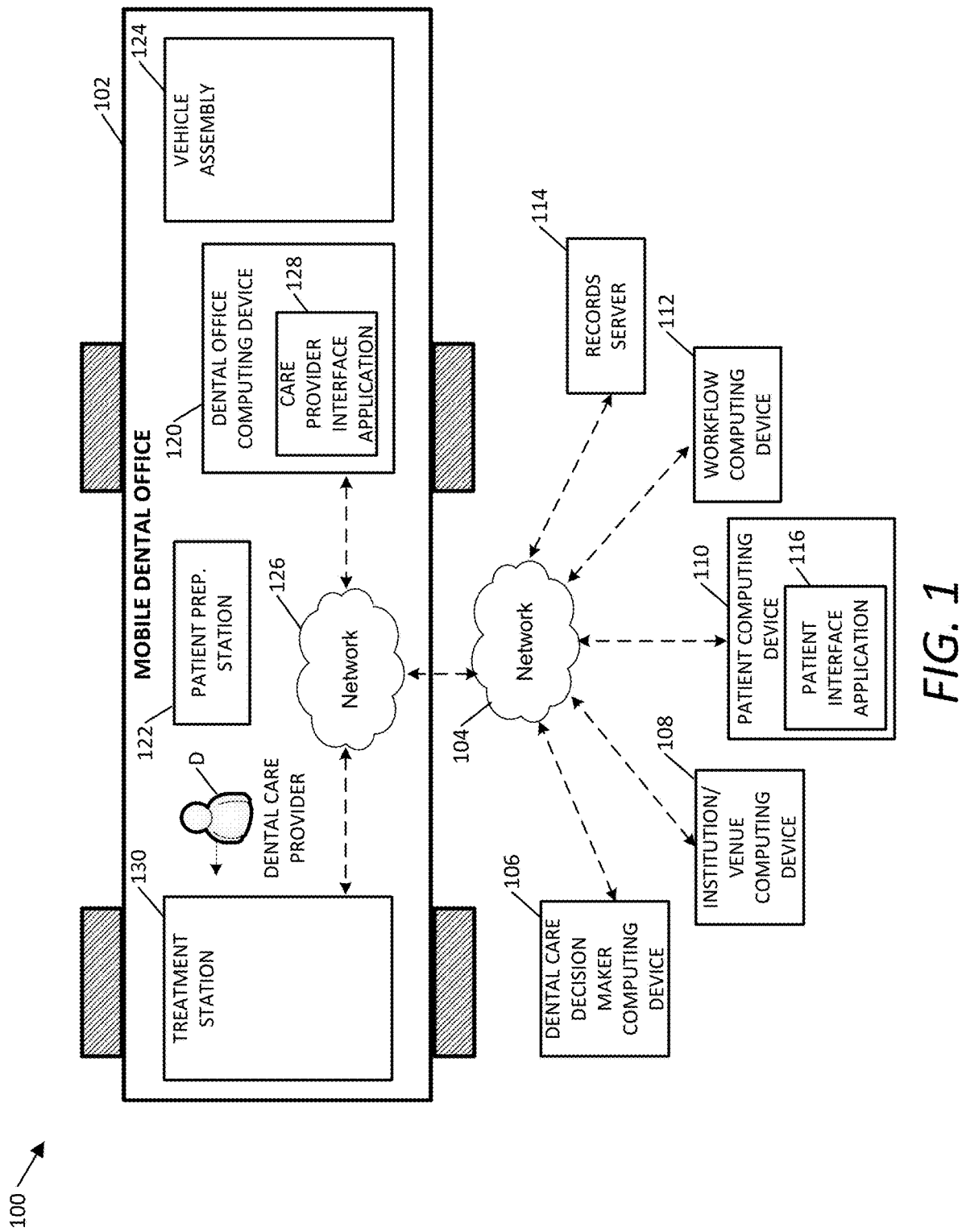
FIG. 1 is a schematic block diagram illustrating an example of a system for providing mobile dental care.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Dental offices commonly consist of a brick-and-mortar office where the doctor and staff see patients on a routine basis. In orthodontics, due to the added number of visits required, it becomes a big inconvenience for both the practice and the parents and students to physically visit these offices.

Parents often desire to schedule appointments before or after school to avoid the need for both parent and child to take time off from work and school, respectively. It is usually not possible for an orthodontist to provide orthodontic care to all patients during these limited time windows.

Commonly, orthodontic (and other dental) appointments do need to be scheduled during school hours, which traditionally then requires that students and often parents take time off from school and work. In the case of the student, an approval/permission from the parent is required for the child to take time off from school.

Here, the mobile dental clinic will come to the patient so that the patient's parents/guardians are not required to take time away from work to bring the patient to the dental clinic. Instead, the mobile dental clinic will be located at the school or designated location to conduct the dental appointment and provide dental care. The mobile dental clinic may also include or integrate with a computing device to facilitate parents/guardians providing approval for a student to leave school to receive dental care.

Brick and mortar dental offices have many ways to market their practices. Many forms of external and internal marketing strategies are employed. Still, all of the marketing is focused on getting prospective patients to come visit an office. This marketing is traditionally executed in a specified zip code area around the practice. The mobile dental clinic may allow a dental care provider to expand their practice and market reach outside of their traditional geographic area by providing full service dental care to work locations, schools, or home of patients.

The mobile dental clinic allows a dental practice to set up a much more effective channel marketing network within their geographic area. Their partners include school districts, school nursing staff, child health care professionals, and teachers within the school districts. It also includes places of work, corporate offices and other businesses where multiple patients can be treated at one place of work. For example, the mobile dental clinic may transmit marketing messages to other potential patients at a school or workplace where it is being used to provide dental care.

Additionally, the mobile dental clinic can come to the patient's home, delivering a much more private and enhanced dental experience. The mobile dental clinic also offers a much lower overhead cost for the dental practice reducing administrative and capital cost for a practice not having to manage a large staff and pay a higher fixed overhead. The mobile dental clinic may also be able to go to patients to provide emergency services or other services when needed. For example, dental hygiene and denture services may be provided via the mobile dental clinic.

FIG. 1 is a schematic block diagram illustrating an example of a system 100 for providing mobile dental care. In this example, the system 100 includes a mobile dental office 102, a network 104, a dental care decision maker computing device 106, an institution/venue computing device 108, a patient computing device 110, a workflow computing device 112, and a records server 114.

The mobile dental office 102 may be configured for a caregiver to provide general dental care, such as dental cleanings and check-ups, using the mobile dental office 102. The mobile dental office 102 may also be configured for a caregiver to provide orthodontic care using the mobile dental office 102. In various implementations, the mobile dental office 102 may be configured for a caregiver to provide other types of specialized dental care, such as prosthodontic dental care, endodontic dental care, and periodontic dental care, using the mobile dental office 102. The mobile dental office 102 being configured for a caregiver to provide a specific type of dental care includes the mobile dental office 102 having equipment that is used to provide that specific type of dental care or having an arrangement that is conducive to providing that specific type of care. In some embodiments, the mobile dental office 102 is configured to provide multiple types of dental care.

In this example, the mobile dental office 102 includes a dental office computing device 120, a patient preparation station 122, a network 126, a vehicle assembly 124, and a treatment station 130. In some implementations, the system 100 may include more than one treatment station 130.

The dental office computing device 120 is a computing device that is used within the mobile dental office 102. The dental office computing device 120 may perform various operations to facilitate scheduling, coordinating, and providing dental care to patients. The dental office computing device 120 may include a care provider interface application 128.

The care provider interface application 128 may include one or more applications that can be used by a care provider. These one or more applications may, for example, include instructions stored on a computer readable medium of the dental office computing device 120. The care provider interface application 128 may, for example, provide an interface for communicating with other computing devices, such as the dental care decision maker computing device 106, the institution/venue computing device 108, the patient computing device 110, and the workflow computing device 112. The care provider interface application 128 may also communicate with the records server 114 to access or update patient records.

The dental office computing device 120 may also communicate with a laboratory computing device (not shown), a supplier computing device, or other computing devices. The laboratory computing device performs various applications for a laboratory that provides services to the mobile dental office 102. Examples of the laboratory include dental and orthodontic laboratories that provide custom-fabricated components (e.g., crowns, bridges, other dental restorations, implants, splints, mouth guards, bracket placement jigs, brackets, etc.) for the mobile dental office 102. In at least some embodiments, the laboratory computing device receives three-dimensional images of patient anatomy that are captured using imaging equipment, such as the imaging equipment 234 (illustrated and discussed with respect to at least FIG. 3). In some examples, the laboratory computing device includes CAD applications that operate to design custom-fabricated components using the three-dimensional image data received from imaging equipment. Once designed using the CAD applications, the custom-fabricated components may be physically modeled using rapid prototyping technologies. Additionally, in some embodiments, the laboratory computing device generates a physical model from the received three-dimensional image data. The physical model may, for example, be generated using rapid prototyping technologies.

The supplier computing device performs various applications for a supplier that provides supplies to the mobile dental office 102. In some embodiments, the supplier computing device may receive image or other data generated by imaging equipment. In some embodiments, the information received by the supplier computing device does not include patient identifiable information. The supplier computing device may use these images or other data to determine a quantity or dimension of various supplies that may be needed by the mobile dental office 102.

The patient preparation station 122 is a physical location within the mobile dental office 102 that includes components a patient may use to prepare for receiving care at the mobile dental office 102. For example, the patient preparation station 122 may include a sink for patients to use for toothbrushing and mouth washing. In some embodiments, the patient preparation station 122 may also include a supply shelf or cabinet that include supplies a patient may use to prepare for the dental care, such as toothbrushes, tooth paste, floss, mouth wash, cups, etc. In some implementations, the patient preparation station 122 is combined with the treatment station 130. Some implementations may include multiple patient preparation stations.

The vehicle assembly 124 is a vehicle that contains or transports the mobile dental office. The vehicle assembly 124 may include any kind of vehicle and any components of a vehicle such as a motor, wheels, and vehicle controls. The vehicle assembly 124 may include one or more computing devices that monitor and control aspects of the movement of the vehicle assembly. In some implementations, the vehicle assembly 124 may include a cargo van or trailer in which the components of the mobile dental office 102 are disposed.

The treatment station 130 is a physical space within the mobile dental office for providing care for a patient. The treatment station 130 may include some or all of the equipment and supplies that are needed to provide care for a patient. Although this figure shows only a single treatment station, some implementations of the mobile dental office include multiple treatment stations allowing for multiple patients to receive care at the same time or allowing for cleaning and sterilization of one treatment station to occur while a patient is receiving dental care in another treatment station. An example treatment station is illustrated and described with respect to FIG. 3.

The dental care decision maker computing device 106 is a computing device used by a dental care decision maker such as a parent or guardian of a patient who is a minor (i.e., a child/non-adult) or otherwise is not legally competent to make decisions regarding dental care. In some embodiments, the system 100 may communicate with the dental care decision maker computing device 106 to notify a dental care decision maker about a dental care procedure that may be performed and to receive informed consent from the dental care decision maker to the performance of the procedure, to receive billing approval, and to facilitate excusing a minor from school or a care facility.

The institution/venue computing device 108 is a computing device used by an institution or venue at which the mobile dental office 102 will provide care. For example, the institution/venue computing device 108 may be associated with a school, an office building, or a care center. In some implementations, the dental office computing device 120 or the workflow computing device 112 may communicate to provide notice of when the mobile dental office will be visiting the institution/venue, to secure a parking location for the mobile dental office 102 and to request release of a minor for an appointment.

The patient computing device 110 is a computing device used by the patient. The patient computing device 110 may include a patient interface application 116. The patient interface application 116 may include one or more applications that can be used by a patient. These one or more applications may, for example, include instructions stored on a computer readable medium of the patient computing device 110. The patient interface application 116 may, for example, provide an interface for communicating with other computing devices, such as the dental office computing device 120. For example, the patient interface application 116 may provide an interface to request or schedule an appointment. The patient interface application 116 may receive notifications from the mobile dental office 102 (e.g., via the dental office computing device 120 or the workflow computing device 112) related to appointment reminders, estimated start time of an appointment (e.g., based on the location of the mobile dental office 102 and the status of any other patients), estimated time of arrival for the mobile dental office 102, etc.

The workflow computing device 112 is a computing device that may communicate with the other computing devices in the system 100 to schedule patient appointments and direct patients to a specific mobile dental office. In some implementations, the workflow computing device 112 may interact with multiple mobile dental offices. For example, the workflow computing device 112 may be configured to receive requests from new patients who are interested in receiving care at a mobile dental office. The workflow computing device 112 may then determine an appropriate mobile dental office for the patient and coordinate the scheduling of an initial consultation for the patient. The workflow computing device 112 may determine an appropriate mobile dental office for the patient based on the patient's current location, home location, school location, work location, care needs, or other factors.

The records server 114 is a computing device that stores patient records. In some embodiments, the records server 114 may store imaging data captured during a visit to the mobile dental office 102, treatment notes, biographic information, contact and relationship information. The records server 114 may include one or more relational or non-relational databases or file systems.

As used herein, a computing device is any type of device that includes any type of programmable electronics. Non-limiting examples of computing devices include desktop computers, portable computers, smartphones, vehicle computers, smart watches, wearable computers, tablet computers.

The network 126 communicates data between one or more computing devices, such as computing devices that comprise the treatment station 130, the dental office computing device 120, or the vehicle assembly 124. The network 126 may also communicate with the network 104 to allow communication with computing devices outside of the mobile dental office 102. The network 126 can be a local area network or a wide area network, such as the Internet. In some implementations, the network 126 may include a WiFi access point (or hotspot) that connects to the Internet via a cellular network.

The network 104 communicates data between one or more computing devices, such as computing devices that comprise the mobile dental office 102, the dental care decision maker computing device 106, the institution/venue computing device 108, the patient computing device 110, the workflow computing device 112, or the records server 114. The network 104 can be a local area network or a wide area network, such as the Internet. In at least some embodiments, the network 126 and the network 104 are a single network, such as the Internet or the same local area network.

Figure 2:
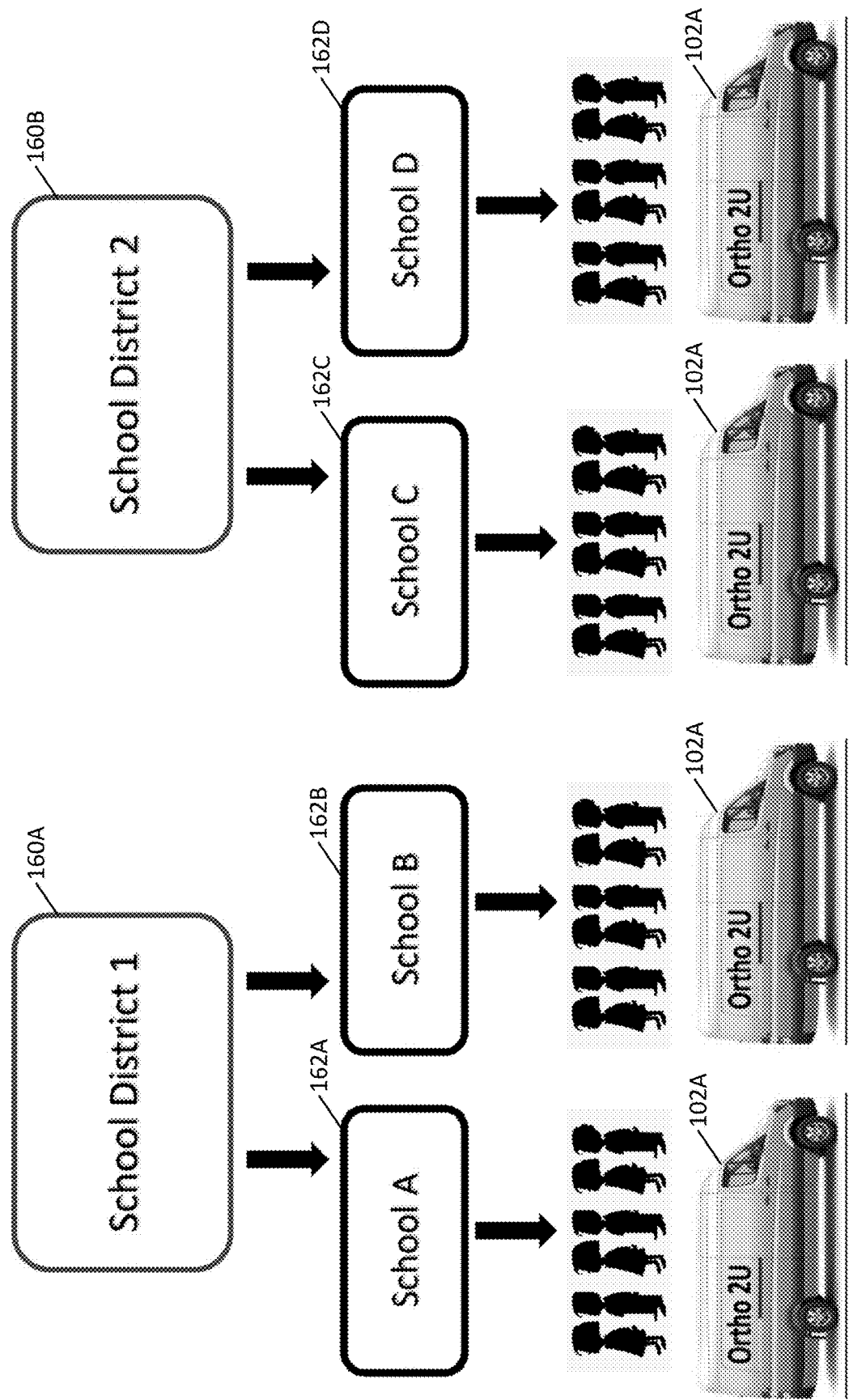
FIG. 2 is a schematic diagram of an example of a mobile dental office providing care to patients from multiple schools in multiple school districts.

FIG. 2 is a schematic diagram of an example of a mobile dental office 102*a* providing care to patients from multiple schools in multiple school districts. The mobile dental office 102*a* is an example of the mobile dental office 102.

This example includes the schools 162A and 162B from a first school district 160A and the schools 162C and 162D from a second school district 160B. The school district 160A and the school district 160B may be referred to collectively as the school districts 160. The school 162A, the school 162B, the school 162C, and the school 162D may be referred to collectively as the schools 162. The schools 162 are examples of institutions/venues where dental care may be provided. For example, the mobile dental office 102*a* may communicate (e.g., via a computing device such as the dental office computing device 120) with the school districts 160 or the schools 162 to coordinate dental care for students to be provided on the grounds of the schools 162.

In this example, a single mobile dental office 102A is providing dental care at multiple institutions and schools (i.e., each of the schools 162). In some implementations, the mobile dental office 102A may use different procedures and communication protocols to communicate with each of the schools. The mobile dental office 102A may be able to provide dental services to patients from a larger geographic area than would be possible from a brick-and-mortar dental office. By providing dental services to a larger geographic area, the mobile dental office 102A may increase the utilization of physical and human dental resources.

Although a single mobile dental office is shown in this figure, multiple mobile dental offices may act in a coordinated manner to provide care at multiple institutions/venues.

Figure 3:
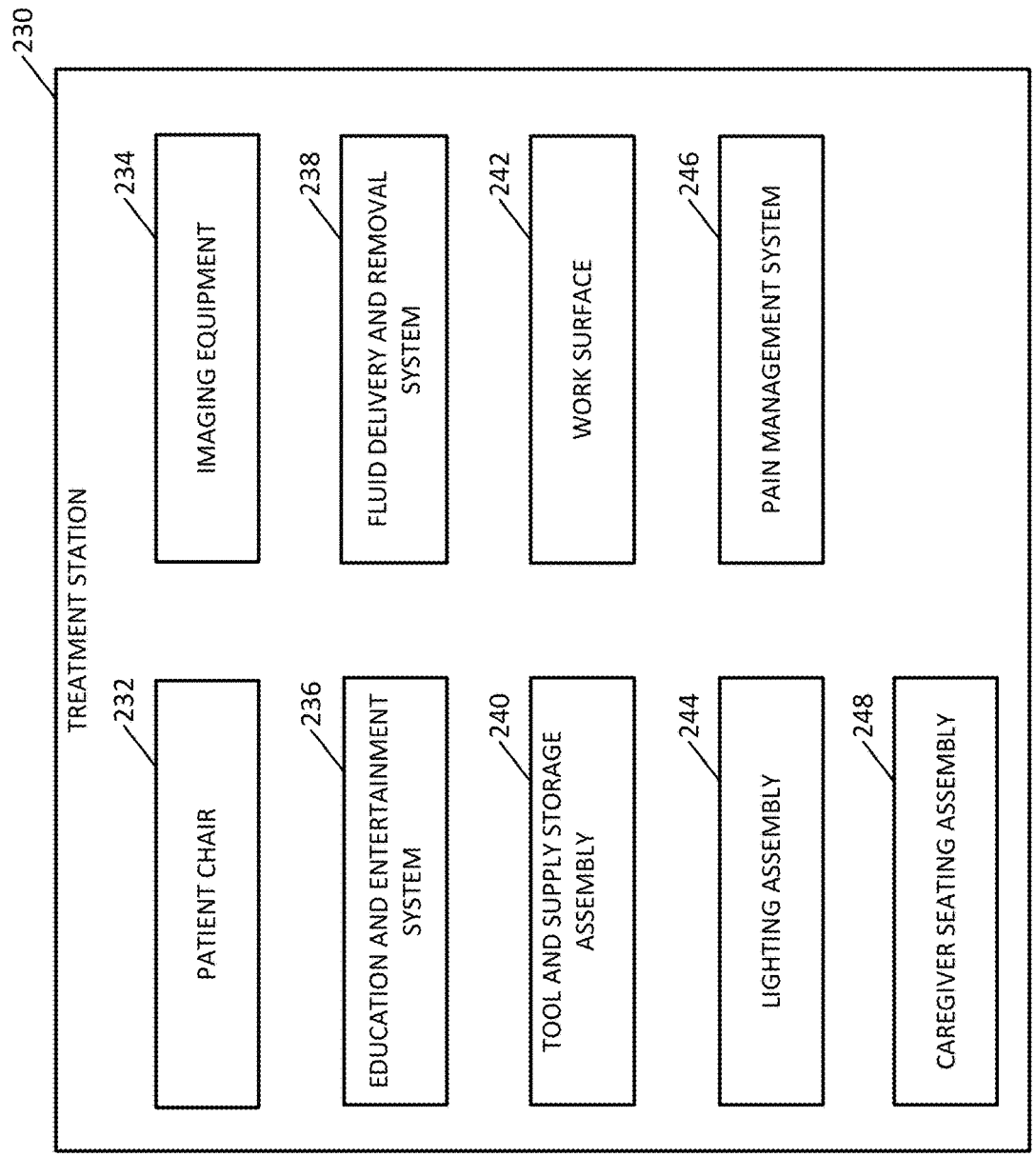
FIG. 3 is a schematic diagram of an embodiment of an example treatment station of FIG. 1.

FIG. 3 is a schematic diagram of an embodiment of a treatment station 230. The treatment station 230 is an example of the treatment station 130.

In this example, the treatment station 230 includes a patient chair 232, imaging equipment 234, education and entertainment system 236, a fluid delivery and removal system 238, a tool and supply storage assembly 240, a work surface 242, a lighting assembly 244, a pain management system 246, and a caregiver seating assembly 248. Some implementations of the treatment station 230 do not include all of these components.

The patient chair 232 is a chair for a patient to sit or lie in while receiving care. The patient chair 232 may, for example, be a reclining dental chair.

The imaging equipment 234 is a system for capturing images of a patient or a portion of the patient, such as the patient's craniofacial anatomy. Non-limiting examples of the craniofacial anatomy of the patient include the patient's dentition, gum tissue, mandible, maxilla, throat/airway, and temporomandibular joint. The imaging equipment 234 may include an optical capture device, such as a camera, that is configured to capture static images of the patient. In some implementations, the imaging equipment 234 may include a three-dimensional scanner such as an intraoral dental scanner that captures a three-dimensional image of a portion of a patient's dentition. The three-dimensional scanner may include an optical scanner. Examples of optical scanners include laser scanners, parallax scanners, and structured light scanners. The imaging equipment 234 may also include an ultrasonic scanner, dental X-ray equipment, or dental cone beam computed tomography equipment. The imaging equipment 234 may transmit images or data back to the records server 114.

The imaging equipment 234 may associate the images with patient data such as biographical information and information about the circumstances under which the image was captured (e.g., location, time, equipment used, notes, procedures being performed or to be performed, etc.). Additionally, in some embodiments, an interface may provide the images to other computers. For example, the dental office computing device 120 or the workflow computing device 112 may include a web server that generates a web interface through which patients, dental care decision makers, colleagues, etc. may access some or all of the images to communicate or collaborate with respect to the patient's dental care.

The education and entertainment system 236 may provide educational or entertainment content to a patient in the treatment station 230. For example, the education and entertainment system 236 may include a screen and audio output device to provide video content to entertain a patient while dental care is being provided. The video content may also be educational content provided by the institution/venue computing device 108 (e.g., to allow a student to remotely join a classroom while receiving dental care). The education and entertainment system 236 may also provide educational content related to the dental care being provided. For example, the education and entertainment system 236 may present images of the patient's dentition that are captured by the imaging equipment 234. The images may be shown with annotations provided by the dental care provider to communicate and educate the patient about treatment and care options.

The fluid delivery and removal system 238 is a device that delivers one or more fluids such as water and removes one or more fluids. The fluid delivery and removal system 238 may include a vacuum system that generates a vacuum so as to collect fluids. The fluid delivery and removal system 238 may be used by a dental care provider to, for example, clean patient dentition and allow a patient to rinse during a dental procedure.

The tool and supply storage assembly 240 is a physical structure that is usable to store tools and supplies for providing dental care. The tool and supply storage assembly 240 may include, for example, a cabinet. The tool and supply storage assembly 240 may be movable with respect to the mobile dental office 102. For example, the tool and supply storage assembly 240 may include lockable wheels or casters that can be released to allow the tool and supply storage assembly 240 to be repositioned.

The work surface 242 is a surface for the dental care provider to use while providing dental care to, for example, hold tools and supplies that are or will be used. The work surface 242 may be a counter-top disposed near the patient chair 232. The work surface 242 may be a movable surface that can be repositioned with respect to the mobile dental office 102. For example, the work surface 242 may include lockable wheels or casters that can be used to reposition the work surface 242 and lock it in place.

The lighting assembly 244 is a system for providing light. For example, the lighting assembly 244 may include one or more light sources. The light sources may be attached to an articulating arm that allows for adjusting the position and orientation of the light source. For example, a dental care provider may adjust the light source to illuminate the patient's dentition so that the dental care provider is better able to see the patient's dentition.

The pain management system 246 is a system that is usable to provide pain management during dental care. The pain management system 246 may include equipment to dispense or provide anesthetics to patients such as procaine products (e.g., the Novocain™ brand anesthetic) or nitrous oxide ($NO_2$).

The caregiver seating assembly 248 is a physical structure on which one or more dental caregivers may sit. For example, the caregiver seating assembly 248 may include one or more stools or chairs. In some implementations, the chairs or stools of the caregiver seating assembly 248 may include lockable wheels or casters that can be released to allow for repositioning of the chairs or stools.

Figure 4:
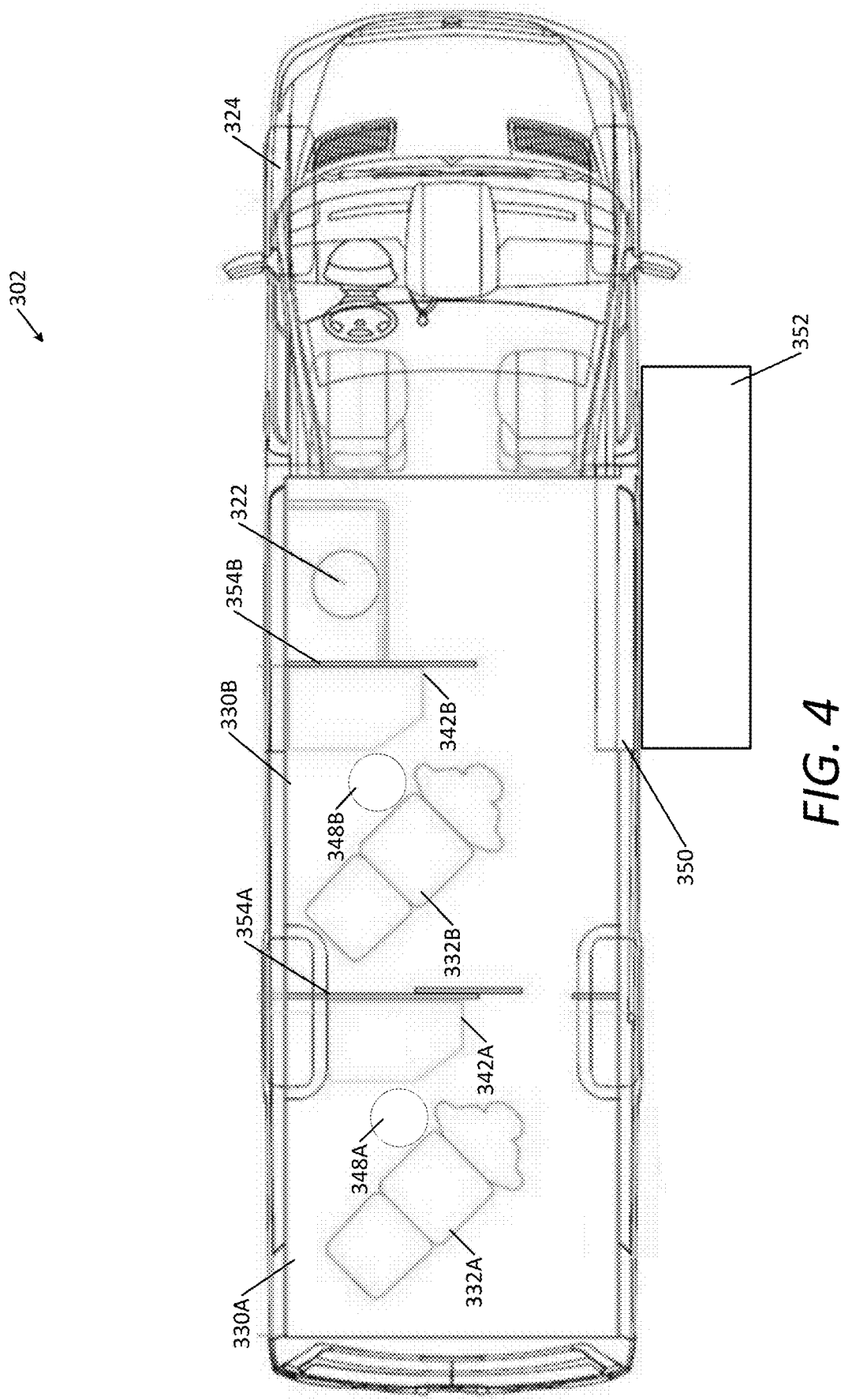
FIG. 4 is a schematic diagram of an example mobile dental office of FIG. 1.

FIG. 4 is a schematic diagram of an example mobile dental office 302. The mobile dental office 302 is an embodiment of the mobile dental office 102. In this example, the mobile dental office 302 includes a patient preparation station 322, a vehicle assembly 324, a patient access door 350, and a ramp 352. The patient preparation station 322 is an embodiment of the patient preparation station 122 and the vehicle assembly 324 is an embodiment of the vehicle assembly 124. In this example, the vehicle assembly 324 is a cargo van. The vehicle assembly may include a cargo area or storage area (sometimes also referred to as a cargo space or storage space), in which other components of the mobile dental office 302 are disposed.

The patient access door 350 is a door that can be opened to allow access to the mobile dental office 302. For example, that patient access door 350 may be a van door of the vehicle assembly 324. The ramp 352 is a physical structure that allows entry to the mobile dental office 302. The ramp 352 may, for example, be sized to allow a wheel chair to roll up and into the mobile dental office 302. The ramp 352 may be removable and configured to be stowed in the mobile dental office 302.

Here, the mobile dental office 302 also includes two treatment stations: treatment station 330A and treatment station 330B. The treatment stations 330A and 330B are embodiments of the treatment station 130. The mobile dental office 302 also includes partition 354A and partition 354B (collectively referred to as partitions 354). The partitions 354 are physical structures, such as walls, that separate the mobile dental office 302 into separate spaces. In this example, the partition 354A separates the treatment station 330A from the treatment station 330B and the partition 354B separates the patient preparation station 322 from the treatment station 330B. In some implementations, the partitions 354 are full-height (i.e., extending from floor to ceiling). In some implementations, the partitions 354 are less than full-height (e.g., the partition may have a gap at the top or bottom). The partition 354A may include a door that can move between open and closed positions. The partitions 354 may provide privacy for patients receiving dental care in one of the treatment stations.

The treatment station 330A includes a patient chair 332A, a work surface 342A, and a caregiver seating assembly 348A. Similarly, the treatment station 330B includes a patient chair 332B, a work surface 342B, and a caregiver seating assembly 348B. The patient chairs 332A and 332B are embodiments of the patient chair 232, the work surfaces 342A and 342B are embodiments of the work surface 242, and the caregiver seating assemblies 348A and 348B are embodiments of the caregiver seating assembly 248.

In this example, the treatment stations 330A and 330B are arranged for a right-handed caregiver. As can be seen, the patient chairs 332A and 332B are oriented such that a patient's head will be near the left side of a caregiver facing the patient on the caregiver seating assembly 348A or 348B, allowing a good angle for access to the patient's mouth with the dominant right hand. In some implementations, the orientation of the patient chairs 332A and 332B and the positions of the caregiver seating assemblies 348A and 348B and the work surfaces 342A and 342B may be altered to allow a good access angle for a left-handed caregiver.

Figure 5:
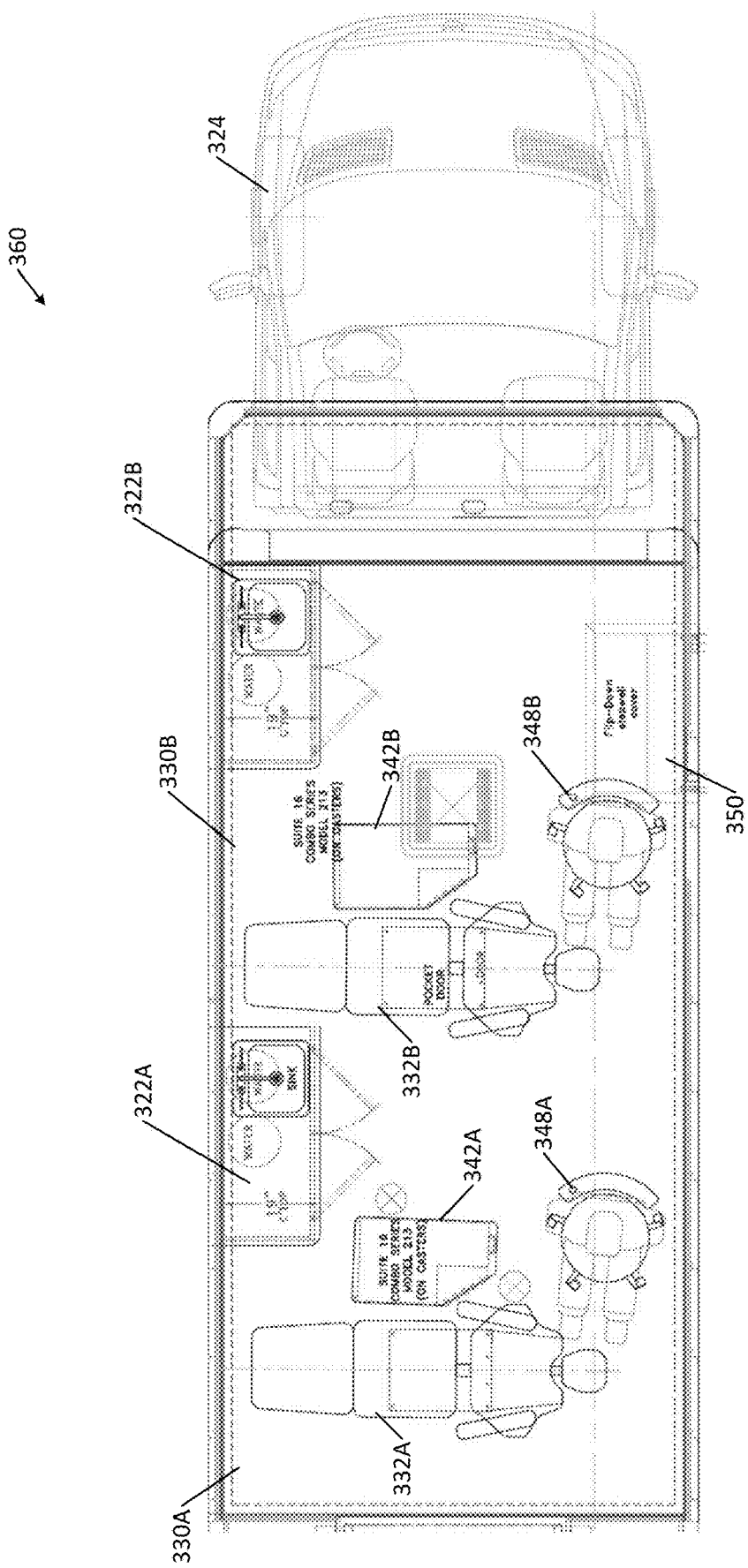
FIG. 5 is a schematic diagram of another example mobile dental office of FIG. 1.

FIG. 5 is a schematic diagram of an example mobile dental office 360. The mobile dental office 360 may be similar to the mobile dental office 302 except that in this example the mobile dental office 360 does not include any partitions between the treatment stations 330A and 330B.

In this example, the mobile dental office 360 includes patient preparation station 322A and patient preparation station 322B, which both may be similar to the previously described patient preparation station 322. The mobile dental office 360 also includes the vehicle assembly 324, the patient access door 350, and the mobile dental office 360 also includes the treatment stations 330A and 330B.

Figure 6:
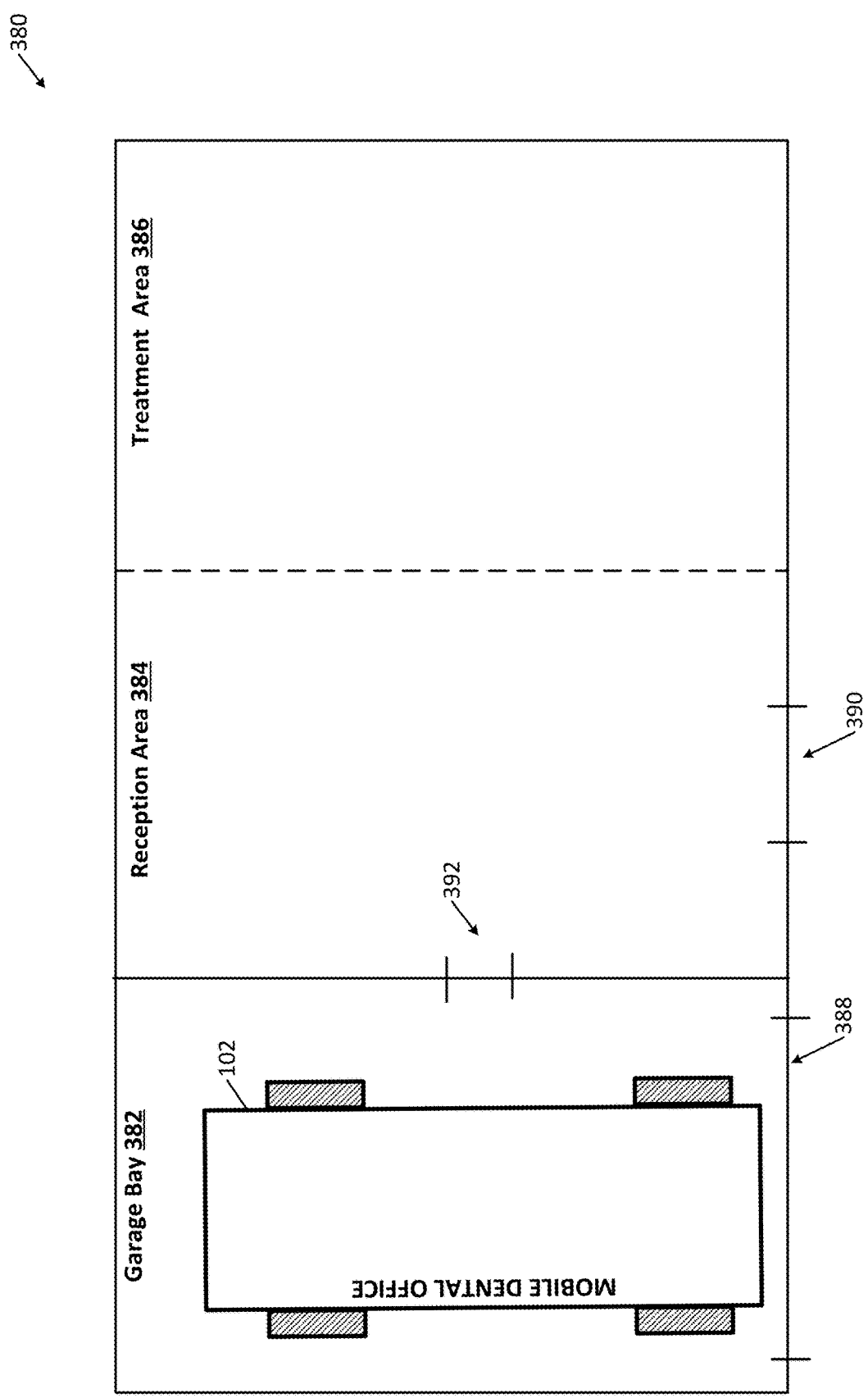
FIG. 6 is a schematic diagram of a hybrid dental office that incorporates the mobile dental office of FIG. 1.

FIG. 6 is a schematic diagram of a hybrid dental office 380. The hybrid dental office 380 may be similar to a traditional brick-and-mortar dental office having a reception area 384 and a treatment area 386 located in a building. Patients mey enter the reception area 384 through a door 390. Additionally, the hybrid dental office 380 includes a garage bay 382. The mobile dental office 102 may be parked in the garage bay 382 when it is not being used to provide mobile dental care. The garage bay 382 may include a garage door 388 that the mobile dental may pass through to enter and exit the garage bay 382. The garage bay 382 may include equipment to maintain and clean the mobile dental office 102. Additionally, the garage bay 382 may include electrical, water, and wastewater connections for the mobile dental office 102.

In some implementations, patients may receive dental care in the mobile dental office 102 while the mobile dental office 102 is parked in the garage bay 382. For example, a door 392 may be used to enter and exit the garage bay 382 from the reception area. The mobile dental office 102 may supplement the capacity of the brick-and-mortar dental office to provide dental care. For example, the treatment area 386 may have a limited number of treatment stations, which can be supplemented by the treatment stations in the mobile dental office 102.

In some implementations, the hybrid dental office 380 may not have any treatment stations in the brick-and-mortar dental office. Instead, all patient care may be provided in the treatment stations of the mobile dental office 102. In at least some of these examples, patients may still undergo imaging (such as CBCT scans) in the treatment are 386 of the hybrid dental office 380.

In some implementations, appointments may be scheduled for dental care at the hybrid dental office 380 during times when the mobile dental office 102 is not visiting other care locations such as schools or other institutions (e.g., appointments outside of common school or work hours such as early morning appointments, later in the day appointments, or weekend appointments).

Figure 7:
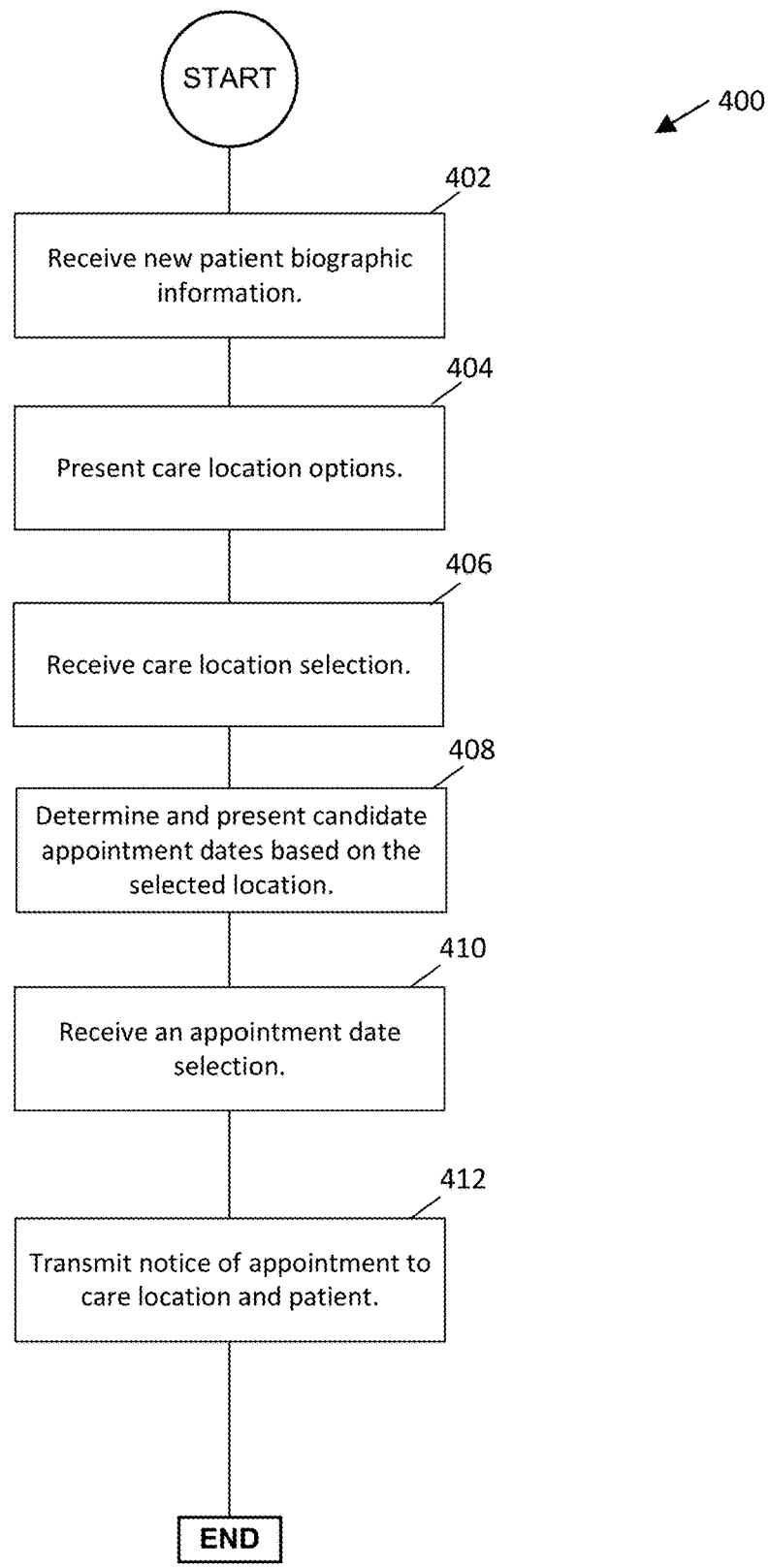
FIG. 7 is a flow chart illustrating an example method of scheduling an appointment for a new patient performed by some embodiments of the system of FIG. 1.

FIG. 7 is a flow chart illustrating an example method 400 of scheduling an appointment for a new patient. In some embodiments, the method 400 is performed by the workflow computing device 112 or the dental office computing device 120. In this example, the method 400 includes operations 402, 404, 406, 408, 410, and 412, which are discussed below in numeric order but, in at least some embodiments, are performed in a different order.

At operation 402, new patient biographic information is received. This biographic information may be received electronically from, for example, the dental care decision maker computing device 106 or the patient computing device 110. The biographic information may include the patient's name, birthdate, reason for seeking care, address and other contact information, and dental care decision maker information (if appropriate). The biographic information may also include information about institutions the patient attends, such as schools or workplaces.

At operation 404, care location options are presented. These care locations may be identified based on the patient's biographic information, such as the patient's address or the institutions the patient attends. A user interface, such as a drop-down menu in a web form or in an application, may list potential care locations based on the patient's biographic information. In some implementations, the potential care locations may be associated with different caregivers and different mobile dental offices. In these cases, the care locations may be presented with information about the caregiver.

At operation 406, a care location selection is received. For example, the selection may be received electronically based on a user input to select a care location from the options presented in operation 404. Based on the care location selection, a specific mobile dental office may be identified for the patient.

At operation 408, candidate appointment dates based on the selected location may be determined and presented. These options may be presented on a user interface such as a drop-down menu. The candidate appointment dates may be determined based on dates a mobile dental office is already scheduled to be providing care at the selected location. For example, a query may be performed to select upcoming appointments at the selected location. Candidate appointment dates may also be identified based on identifying dates or blocks of time (e.g., half days) on which no appointments have yet been scheduled for the mobile dental office.

At operation 410, an appointment date selection. The appointment date selection may be received electronically based on a user input received on a user interface.

At operation 412, notice of the appointment is transmitted to the institution/venue associated with the care location and to the patient. The notice may also be transmitted to a dental care decision maker for the patient (e.g., a parent or guardian) if the patient is a minor. In some implementations, the notice may also include information and forms the patient (or dental care decision maker) must sign before care is to be provided. For example, the notice may include an authorization form to excuse the patient from school and an informed consent form to consent to the care or treatment that the patient will be provided. These forms may, for example, be signed and returned electronically. In some implementations, appointments cannot be scheduled (or confirmed) until the appropriate informed consent has been signed.

Figure 8:
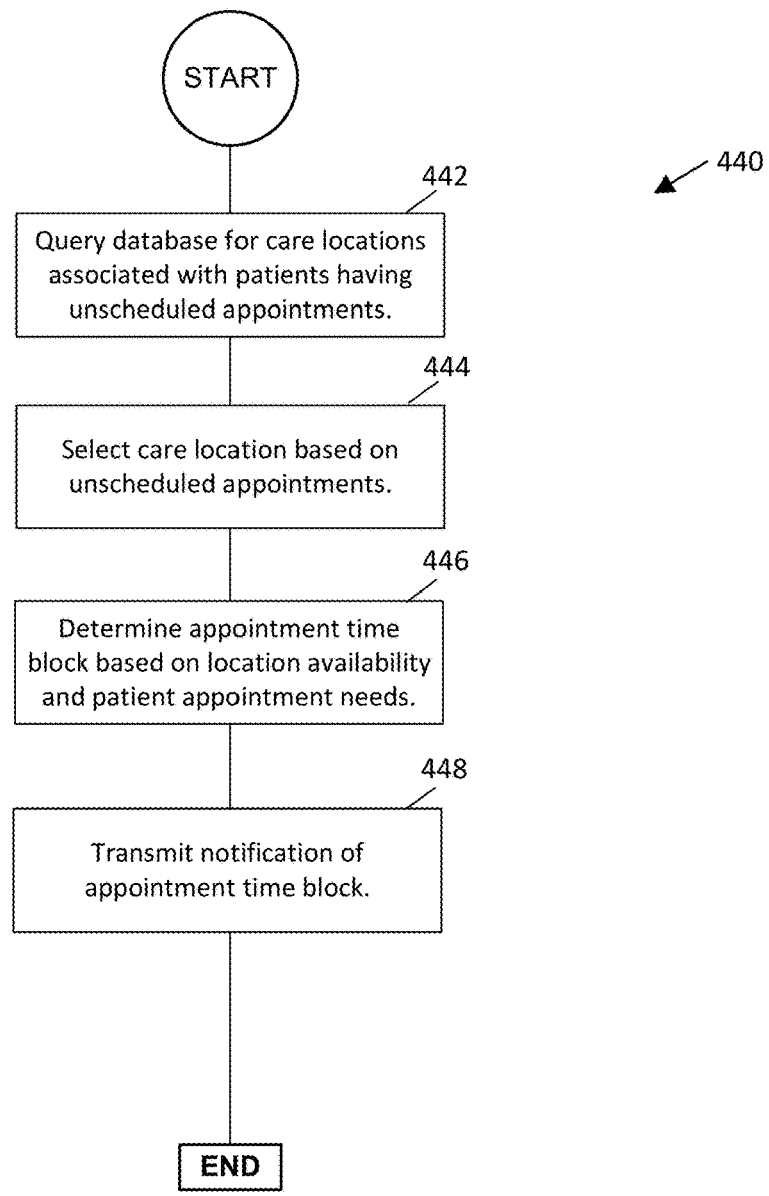
FIG. 8 is a flow chart illustrating an example method of determining a care location performed by some embodiments of the system of FIG. 1.

FIG. 8 is a flow chart illustrating an example method 440 of determining a care location. In some embodiments, the method 440 is performed by the workflow computing device 112 or the dental office computing device 120. In this example, the method 440 includes operations 442, 444, 446, and 448, which are discussed below in numeric order but, in at least some embodiments, are performed in a different order.

At operation 442, a database is queried for care locations associated with patients having unscheduled appointments. The query may specify a date or range of dates. These dates may be identified based on openings in the mobile dental office's schedule. For example, patient records may indicate that a specific patient is due for follow-up care or a routine check-up during the date specified in the query. In some implementations, the query does not include a date. Instead, the query may return all patients with unscheduled appointments.

At operation 444, a care location (or an associated institution/venue) may then be selected based on the unscheduled appointments returned by the query. In some implementations, the care location is selected based on the number of unscheduled appointments that need to be scheduled at the care location. For example, the care location may be selected based on being associated with more unscheduled appointments than any other care locations.

At operation 446, an appointment time block is determined based on location availability and patient appointment needs. For example, the appointment time block may be determined based on the quantity and the expected durations of any unscheduled appointments. In some implementations, the appointment time block is also determined to allow for transition time between appointments. The appointment time block then may be determined based on hours of operation of the associated institution/venue. For example, if the associated institution/venue is a school, the appointment time block may be scheduled during the hours of operation of the school and on a day in which the school is in operation. Information about the hours and date of the operation may be retrieved from the institution/venue computing device 108 in some implementations.

At operation 448, notification of appointment time block is transmitted. The notification may, for example, be transmitted electronically via email, text message, or otherwise. The notification may be transmitted to the institution/venue computing device 108. In some implementations, notifications are also transmitted to one or more patient computing devices (or parent/guardian computing devices). In some implementations, appointments are scheduled (as illustrated and further described with respect to at least FIG. 9) for at least some of the patients identified at operation 442. In these implementations, the notification may include a specific appointment time for the patient. Some implementations also send a notification to patients associated with the institution/venue to provide an opportunity to schedule an appointment if needed.

Figure 9:
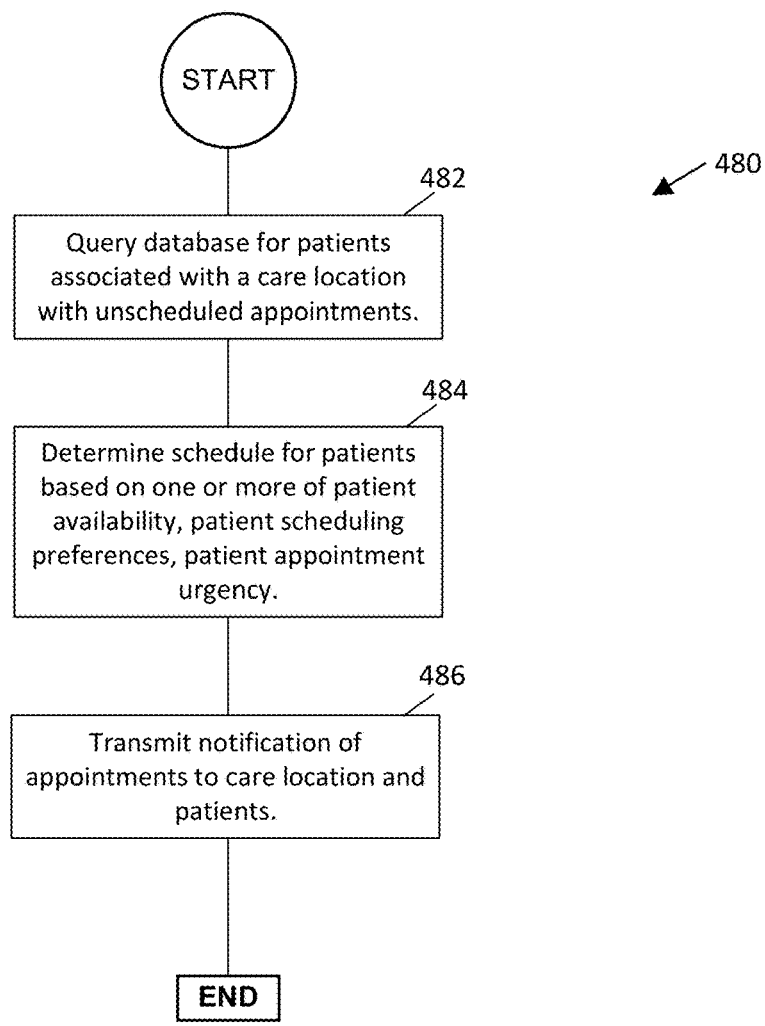
FIG. 9 is a flow chart illustrating an example method of scheduling appointments for a care location performed by some embodiments of the system of FIG. 1.

FIG. 9 is a flow chart illustrating an example method 480 of scheduling appointments for a care location. In some embodiments, the method 480 is performed by the workflow computing device 112 or the dental office computing device 120. In this example, the method 440 includes operations 482, 484, and 486, which are discussed below in numeric order but, in at least some embodiments, are performed in a different order.

At operation 482, a database is queried for patients associated with a care location who have unscheduled appointments. These appointments may be new patient consultations, routine check-ups (e.g., twice a year dental cleanings), or follow-up visits for an ongoing treatment (e.g., an adjustment to braces).

At operation 484, a schedule for patients is determined based on one or more of patient availability, patient scheduling preferences, and patient appointment urgency. In some implementations, records associated with the patient may be queried to determine various scheduling constraints for the patient. The schedule may be determined according to various scheduling factors, such as by first scheduling the patients who have the most urgent care needs or by first scheduling the patients who have the most scheduling constraints. Other scheduling factors may be used as well. Various scheduling processes may be used to develop a schedule that accommodate all (or as many as possible) of the patients.

At operation 486, notifications of appointments are transmitted to one or both of the institution/venue and the patients. These notifications may be sent via email, text message, or via another electronic communication method.

FIG. 10 is an example schedule 500 that may be generated and followed by a mobile dental office. For example, this schedule 500 may be generated by the method 440 and the method 480, which are illustrated and described with respect to at least FIGS. 6 and 7.

The schedule 500 may, for example, be followed by the mobile dental office 102. Here, the schedule 500 represents a single day of appointments for the mobile dental office 102. The appointments are grouped by location (i.e., the institute or venue where the appointment will be conducted). Here, the appointments are scheduled at six different locations: School A, School B, School C, School D, Bank 1, and Home. Beginning at 7:30, six patients have appointments scheduled at School A. Beginning at 9:15, six patients have appointments scheduled at School B. Beginning at 11:00, six patients have appointments scheduled at School C. Beginning at 1:30, six patients have appointments scheduled at School D. Beginning at 3:30, six patients have appointments scheduled at Bank 1. Beginning at 5:30, two patients have appointments scheduled at Home 1.

The schedule 500 may, for example, have been generated based on the needs of patients and information about the patient's locations and preferred location (or institute/venue) for receiving treatment. The schedule 500 may then be derived based on the duration of required appointments and travel time between institutions/venues for treatment. As can be seen, the institute/venue for treatment may be a school such as School A, School B, School C, and School D, an office such as Bank 1, or a private residence such as Home 1. Depending on arrangements with the institutions/venues, the mobile dental office 102 may see patients who are students, employees, residents, or even members of the general public. For example, the patients scheduled at Bank 1 may be employees of Bank 1, customers of Bank 1, or other members of the general public who have elected to receive care from the mobile dental office 102 at Bank 1.

In this example, at any given time two patients may be receiving dental care in the mobile dental office 102. Specifically, one patient may be scheduled in each treatment station of the mobile dental office 102. In some implementations, the mobile dental office 102 may include more or fewer than two treatment stations and more or fewer than two patient appointments may be scheduled simultaneously.

Figure 11:
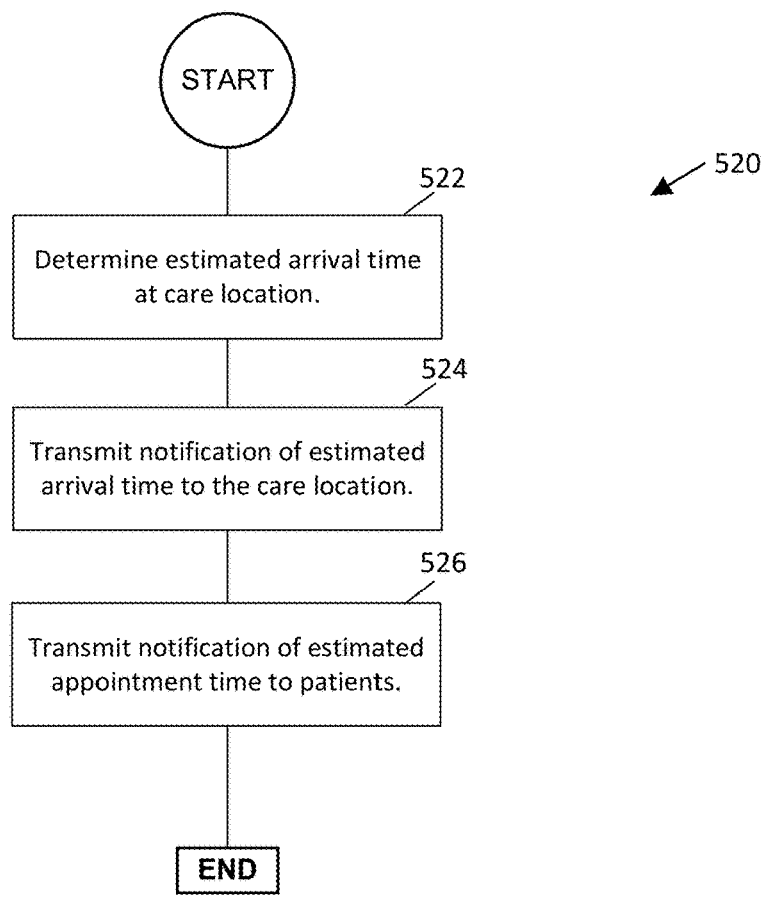
FIG. 11 is a flow chart illustrating an example method of providing notifications of upcoming appointments to patients performed by some embodiments of the system of FIG. 1.

FIG. 11 is a flow chart illustrating an example method 520 of providing notifications of upcoming appointments to patients. In some embodiments, the method 520 is performed by the workflow computing device 112 or the dental office computing device 120. In this example, the method 520 includes operations 522, 524, and 526, which are discussed below in numeric order but, in at least some embodiments, are performed in a different order.

At operation 522, an estimated arrival time at care location is determined. The estimated arrival time may be determined based on a location of the mobile dental office (e.g., as determined by a location determining device) and, in some implementations, a mapping application and traffic data. The traffic data may include real-time traffic data or historical traffic data. The real-time traffic data may include estimated travel times based on congestion, accidents, construction, road closures, weather, or other factors that may impact travel time. Historical traffic data may include estimated travel times based on historical congestion and travel time information.

At operation 524, notification of an estimated arrival time is transmitted to the care location (i.e., the institution or venue). The notification may be transmitted using any means of communication, including electronic communication such as email or text message.

At operation 526, notification of estimated appointment time is transmitted to patients. The estimated appointment time may be based on the estimated time of arrival of the mobile dental office and the estimated duration of any appointments preceding the patient's appointment. The notification may be transmitted using any means of communication, including electronic communication such as email or text message.

In some implementations, the dental office computing device may generate an interface that indicates the real-time location of the mobile dental office so that patients, dental care decision makers, or the institutions/venues may check on or follow the location of the mobile dental office.

Figure 12:
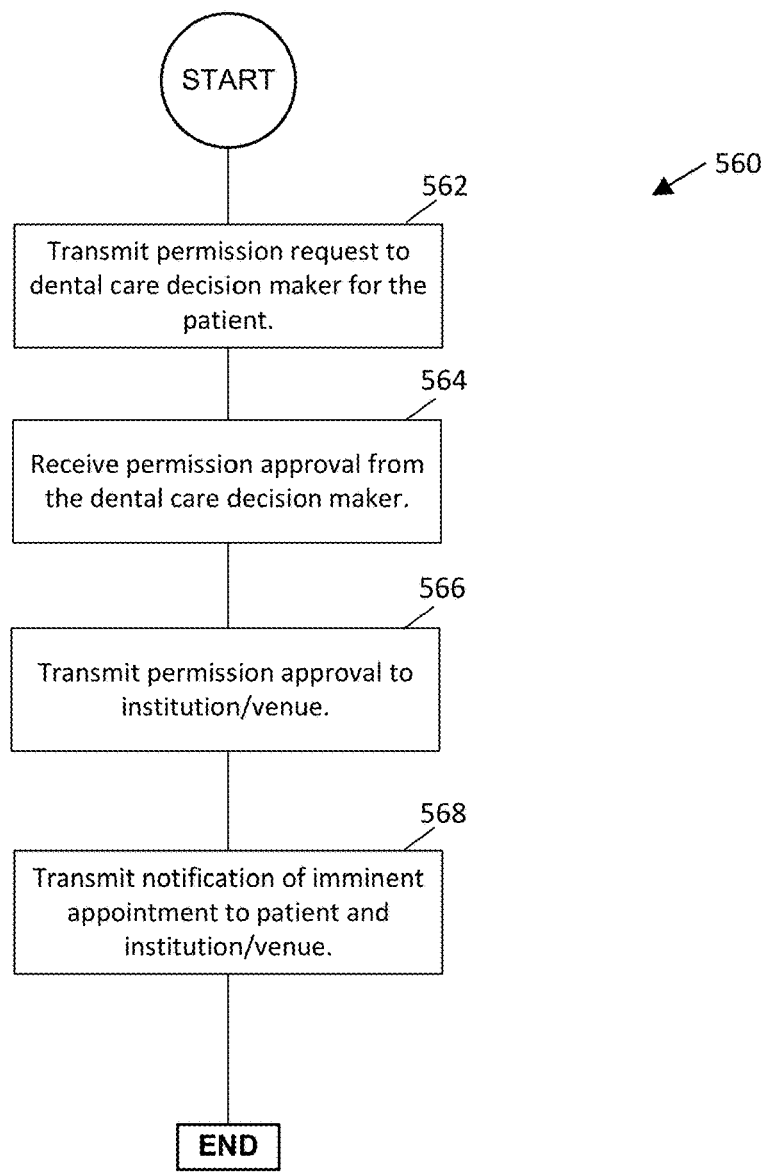
FIG. 12 is a flow chart illustrating an example method of starting an appointment for a patient performed by some embodiments of the system of FIG. 1.

FIG. 12 is a flow chart illustrating an example method 560 of starting an appointment for a patient. In some embodiments, the method 560 is performed by the workflow computing device 112 or the dental office computing device 120. In this example, the method 560 includes operations 562, 564, 566, and 568, which are discussed below in numeric order but, in at least some embodiments, are performed in a different order.

At operation 562, a permission request is transmitted to the dental care decision maker for the patient. The permission request may seek permission to excuse the patient from school for an appointment in the mobile dental office. The permission request may also include an informed consent that the dental care decision maker can sign to consent to any treatment the patient receives. In some implementations, the dental office computing device 120 or the education and entertainment system 236 may include video conferencing capabilities that allow the caregiver and the patient to discuss any proposed care or dental diagnoses with a dental care decision maker via video conference so that the dental care decision maker can be educated and informed by the caregiver before providing consent to any related procedures. The permission request may be transmitted by any means of communication, including electronic communication such as email or text message.

At operation 564, permission approval is received from the dental care decision maker. The permission approval may be received electronically from the dental care decision maker. The permission approval may include a digital signature provided by the dental care decision maker.

At operation 566, the permission approval may then be transmitted to the institution/venue. The permission approval may be transmitted electronically to the institution/venue. In some implementations, the permission approval may be shown to a staff member (e.g., a school nurse) of the institution/venue (e.g., on a mobile computing device or printed sheet of paper) if a dental care provider enters the institution to meet and accompany the patient to the mobile dental office 102.

At operation 568, notification of an imminent appointment is transmitted to the patient and institution. In some implementations, when all permissions have been secured and it is time for the patient to leave class or work to go to the mobile dental office for dental care, an electronic notification is transmitted to the patient and the institution. For example, a notification may be transmitted to the patient via text message. The notification may also be transmitted to a staff member of the institution (e.g., the school nurse).

The notification may be transmitted upon completion of a preceding appointment or upon arrival and completion of setup of the mobile dental office. In some implementations, the notification is transmitted prior to completion of setup or completion of the preceding appointment. For example, some implementation may include a specific time buffer to allow the patient time to, for example, leave and move to the location of the mobile dental office. Notifications may be transmitted when the dental office computing device 120 determines that the preceding appointment or setup is estimated to be complete within the buffer time period. The patient can then be checked out of the school or other institution, if necessary, for the appointment.

Figure 13:
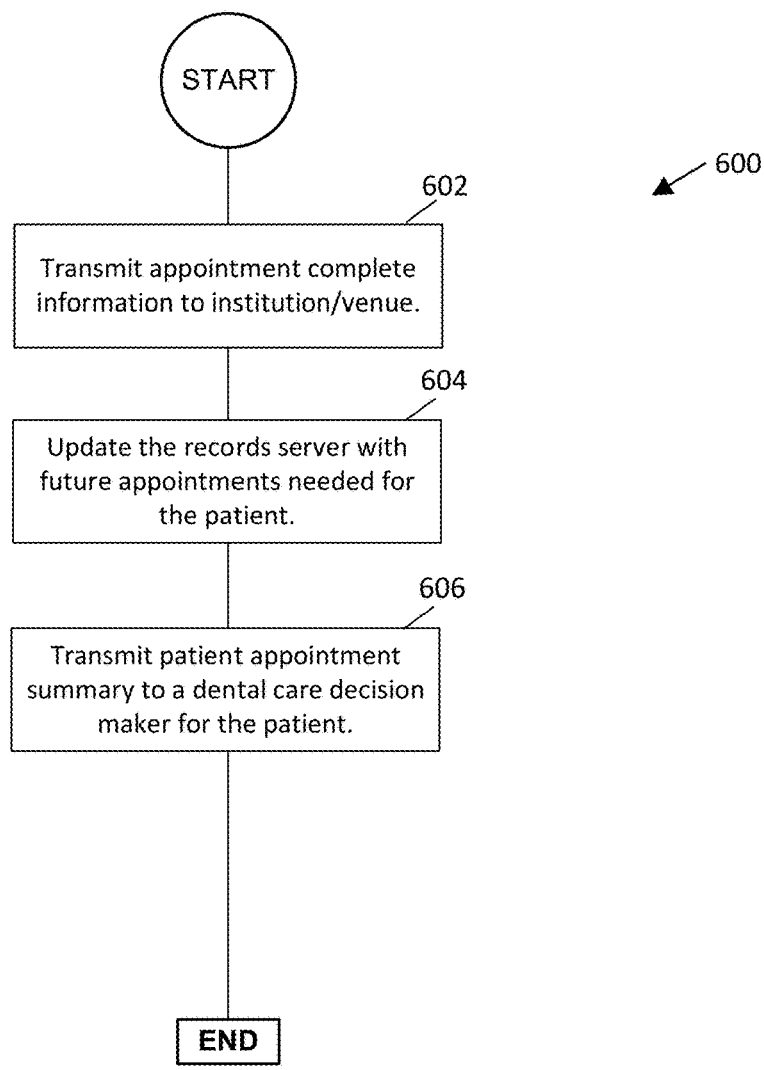
FIG. 13 is a flow chart illustrating an example method of completing an appointment for a patient performed by some embodiments of the system of FIG. 1.

FIG. 13 is a flow chart illustrating an example method 600 of completing an appointment for a patient. In some embodiments, the method 600 is performed by the workflow computing device 112 or the dental office computing device 120. In this example, the method 600 includes operations 602, 604, and 606, which are discussed below in numeric order but, in at least some embodiments, are performed in a different order.

At operation 602, appointment complete information is transmitted to the institution/venue. This information may be provided so that the institution is aware that the patient will be returning and that any additional absence should not be excused on the basis of receiving dental care. The information may be provided to the institution electronically.

At operation 604, the records server is updated with information about future appointments needed for the patient. For example, new records may be added to the records server to indicate any future unscheduled appointments. These records may, for example, be used by the method 440 to schedule future appointments.

At operation 606, a patient appointment summary is transmitted to the the dental care decision maker. The patient appointment summary may include a written report of the care provided, any findings or diagnoses, and any recommended follow-up care or appointments. The appointment summary may also include the times the appointment started and ended. The appointment summary may include textual information, images, and videos. For example, a caregiver may record a brief spoken summary of the care findings using the dental office computing device 120 or the education and entertainment system 236. This spoken summary may be recorded with the patient present. In some implementations, the summary may be provided using real-time video conferencing.

Figure 14:
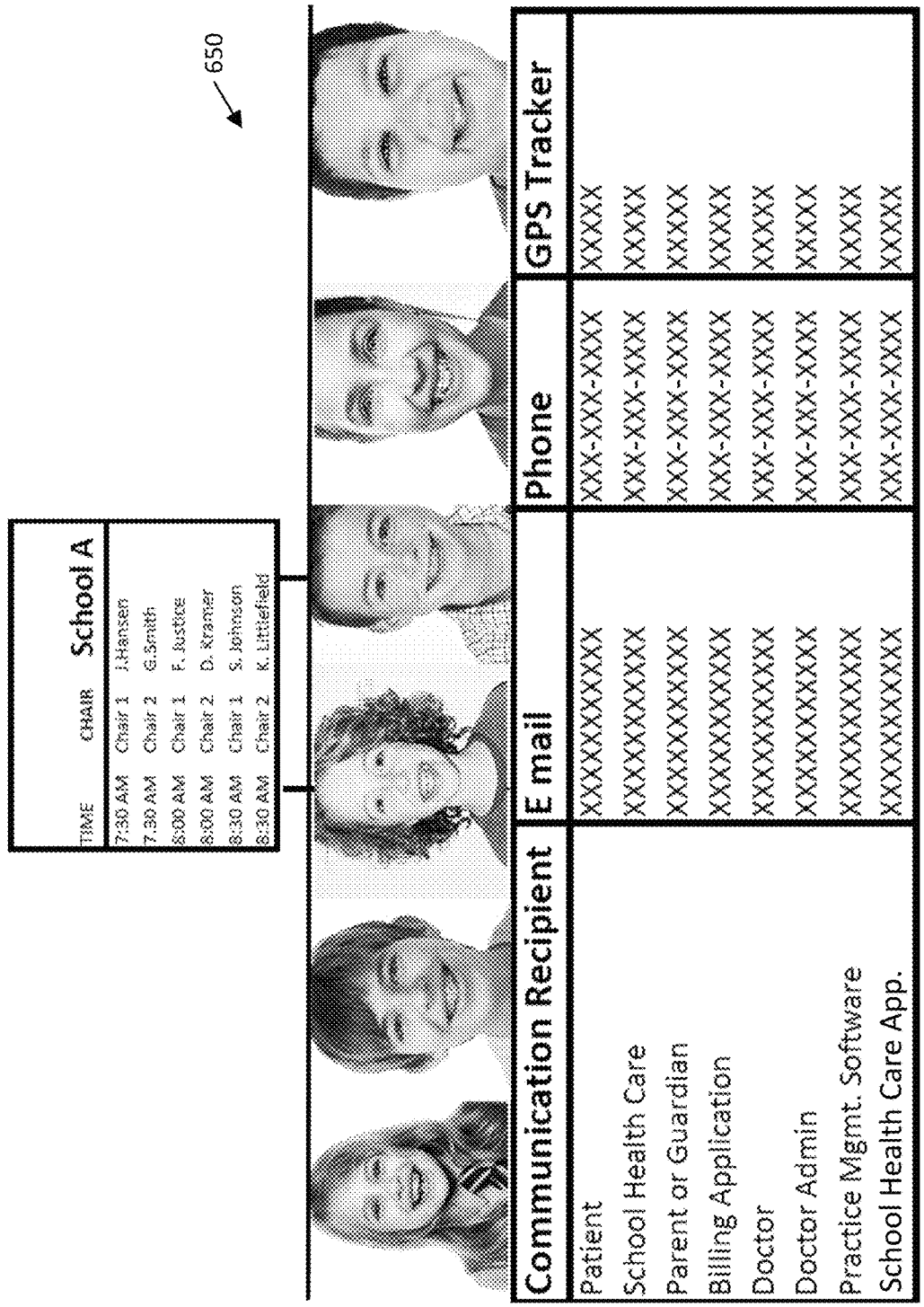
FIG. 14 illustrates an example of a communication information table that may be used in some implementations of the system of FIG. 1.

FIG. 14 illustrates an example of a communication information table 650 that may be used in some implementations. Here, a portion of the schedule 500 from FIG. 10 is also shown. The communication information table 650 may store information and data about the patients with upcoming appointments.

In some implementations, communication information may be stored for others in addition to the patient. In this example, the communication information table 650 includes data for the patient, a school health care contact (e.g., a nurse or health care office) for the patient, and a dental care decision maker for the patient. The communication information table 650 may also include information for communicating with a billing application, a doctor or other dental care provider, an administrator associated with the dental care provider, a practice management software application for the dental care practice, or a school health care application.

In various applications, various types of communication information may be stored in the communication information table 650. For example, the communication information may include an email, phone, or GPS information. Not all information may be stored in all rows. For example, GPS information may be stored for the mobile dental office 102. Other types of communication information may also be stored such as an application programming interface (API) address or key.

Figure 15:
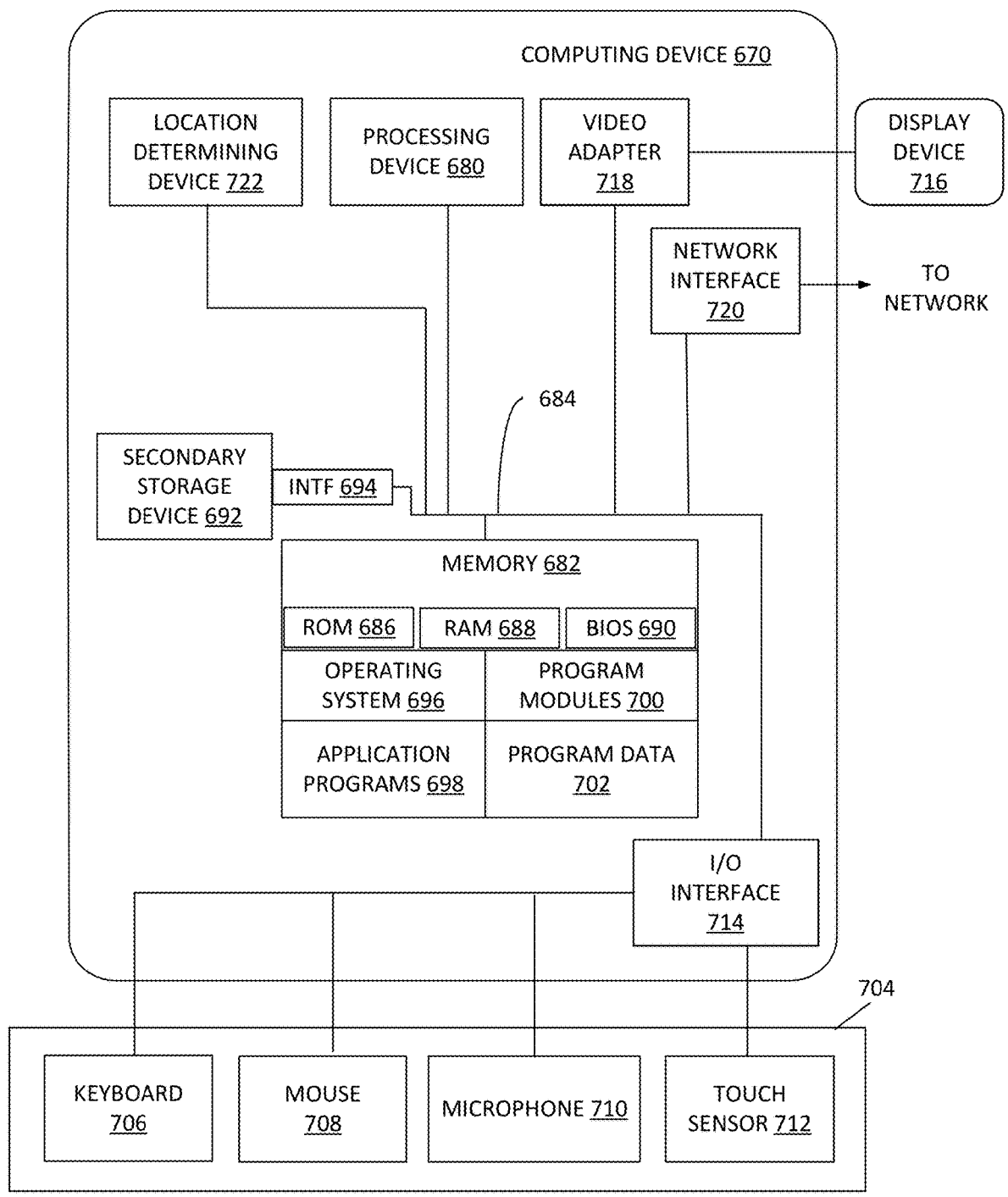
FIG. 15 illustrates an example architecture of a computing device, which can be used to implement aspects according to the present disclosure.

FIG. 15 illustrates an exemplary architecture of a computing device 670 that can be used to implement aspects of the present disclosure, including any of the plurality of computing devices described herein, such as the computing devices comprising the dental office computing device 120, vehicle assembly 124, treatment station 130, dental care decision maker computing device 106, institution/venue computing device 108, patient computing device 110, workflow computing device 112, or records server 114 and any other computing devices that may be used in the various possible embodiments.

The computing device illustrated in FIG. 15 can be used to execute the operating system, application programs, and software modules (including the software engines) described herein.

The computing device 670 includes, in some embodiments, at least one processing device 680, such as a central processing unit (CPU). A variety of processing devices are available from a variety of manufacturers, for example, Intel or Advanced Micro Devices. In this example, the computing device 670 also includes a system memory 682, and a system bus 684 that couples various system components including the system memory 682 to the processing device 680. The system bus 684 is one of any number of types of bus structures including a memory bus, or memory controller; a peripheral bus; and a local bus using any of a variety of bus architectures.

Examples of computing devices suitable for the computing device 670 include a desktop computer, a laptop computer, a tablet computer, a mobile computing device (such as a smartphone, an iPod® or iPad® mobile digital device, or other mobile devices), or other devices configured to process digital instructions.

The system memory 682 includes read only memory 686 and random access memory 688. A basic input/output system 690 containing the basic routines that act to transfer information within computing device 670, such as during start up, is typically stored in the read only memory 686.

The computing device 670 also includes a secondary storage device 692 in some embodiments, such as a hard disk drive, for storing digital data. The secondary storage device 692 is connected to the system bus 684 by a secondary storage interface 694. The secondary storage devices 692 and their associated computer readable media provide nonvolatile storage of computer readable instructions (including application programs and program modules), data structures, and other data for the computing device 670.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 692 or system memory 682, including an operating system 696, one or more application programs 698, other program modules 700 (such as the software engines and applications described herein), and program data 702. The computing device 670 can use any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices or smartphone devices.

In some embodiments, a user provides inputs to the computing device 670 through one or more input devices 704. Examples of input devices 704 include a keyboard 706, mouse 708, microphone 710, and touch sensor 712 (such as a touchpad or touch sensitive display). Other embodiments include other input devices 704. The input devices are often connected to the processing device 680 through an input/output interface 714 that is coupled to the system bus 684. These input devices 704 can be connected by any number of input/output interfaces, such as a parallel port, serial port, game port, or a universal serial bus. Wireless communication between input devices and the interface 714 is possible as well, and includes infrared, BLUETOOTH® wireless technology, 802.11a/b/g/n, cellular, ultra-wideband (UWB), ZigBee, or other radio frequency communication systems in some possible embodiments.

In this example embodiment, a display device 716, such as a monitor, liquid crystal display device, projector, or touch sensitive display device, is also connected to the system bus 684 via an interface, such as a video adapter 718. In addition to the display device 716, the computing device 670 can include various other peripheral devices (not shown), such as speakers or a printer.

The computing device 670 may also include a location determining device 722. The location determining device 722 may include a global positioning system (GPS) device that can determine the location of the computing device 670. The processing device 680 may communicate with the location determining device 722 via the system bus 684.

When used in a local area networking environment or a wide area networking environment (such as the Internet), the computing device 670 is typically connected to the network through a network interface 720, such as an Ethernet interface. Other possible embodiments use other communication devices. For example, some embodiments of the computing device 670 include a modem for communicating across the network.

The computing device 670 typically includes at least some form of computer readable media. Computer readable media includes any available media that can be accessed by the computing device 670. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 670.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 15 is also an example of programmable electronics, which may include one or more such computing devices, and when multiple computing devices are included, such computing devices can be coupled together with a suitable data communication network so as to collectively perform the various functions, methods, or operations disclosed herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of this disclosure.

What is claimed is:

1. A mobile dental office for providing mobile dental care, the mobile dental office comprising:
a vehicle assembly having a physically connected storage space, the vehicle assembly being configured to provide a motive force to move the mobile dental office;
a first treatment station disposed in the storage space, the first treatment station configured to be usable to provide dental care to a first patient within the storage space; and
a computing device and a location determining device, wherein the computing device is configured to transmit notifications to patients about upcoming appointments based on a current location of the mobile dental office determined using the location determining device.

2. The mobile dental office of claim 1, further comprising a second treatment station disposed in the storage space, the second treatment station configured to be usable to provide dental care to a second patient within the storage space.

3. The mobile dental office of claim 2, further comprising a partition disposed between the first treatment station and the second treatment station.

4. The mobile dental office of claim 3, wherein the partition includes a door that is movable between an open position and a closed position, the open position allowing passage between the first treatment station and the second treatment station and the closed position preventing passage between the first treatment station and the second treatment station.

5. The mobile dental office of claim 1, wherein the first treatment station includes a patient chair, the patient chair being fixed to a floor of the storage space.

6. The mobile dental office of claim 5, wherein the first treatment station further includes a work surface that includes a coupling mechanism to secure the work surface within the storage space so as to prevent movement of the work surface relative to the vehicle assembly.

7. The mobile dental office of claim 1, wherein the computing device is configured to:
determine an estimated arrival time at a care location; and
transmit a notification of an estimated appointment time at the care location to a patient and the care location.

8. The mobile dental office of claim 7, wherein the estimated arrival time is determined based on the current location of the mobile dental office and traffic data.

9. The mobile dental office of claim 1, wherein the computing device is further configured to:
transmit a permission request to a dental care decision maker, the permission request including a request for permission to excuse the patient from an institution associated with a care location for a dental appointment;
receive from the dental care decision maker approval of the permission request; and
responsive to the receiving the permission approval, transmit the approval of permission request to the institution.

10. The mobile dental office of claim 9, wherein the computing device is further configured to:
receive an input indicating an appointment is complete; and
responsive to receiving the input:
transmit a notification to the institution that the appointment is complete; and
transmit a summary of the appointment to the dental care decision maker.

11. The mobile dental office of claim 9, wherein the computing device is further configured to:
determine a current dental appointment is nearing completion;
responsive to determining the current dental appointment is nearing completion, transmit a notification to a patient for an upcoming dental appointment, the notification including an estimated start time for the upcoming dental appointment.

12. The mobile dental office of claim 9, wherein the computing device is configured to provide location information for the mobile dental office to an interface for tracking the location of the mobile dental office.

13. The mobile dental office of claim 1, further comprising imaging equipment for capturing images of a patient's craniofacial anatomy.

14. The mobile dental office of claim 13, wherein the imaging equipment is configured to transmit images to a records server.

15. The mobile dental office of claim 13, wherein the imaging equipment is further configured to associate images with patient data.

16. The mobile dental office of claim 13, wherein the imaging equipment is further configured to associate images with information about the location in which the image was captured.

17. The mobile dental office of claim 1, further comprising an education and entertainment system configured to provide education content provided by a computing device associated with the institution.

18. The mobile dental office of claim 17, wherein at least one of the computing device and the education and entertainment system include video conferencing capabilities for communication with the dental care decision maker.

* * * * *